United States Patent Office 2,739,897
Patented Mar. 27, 1956

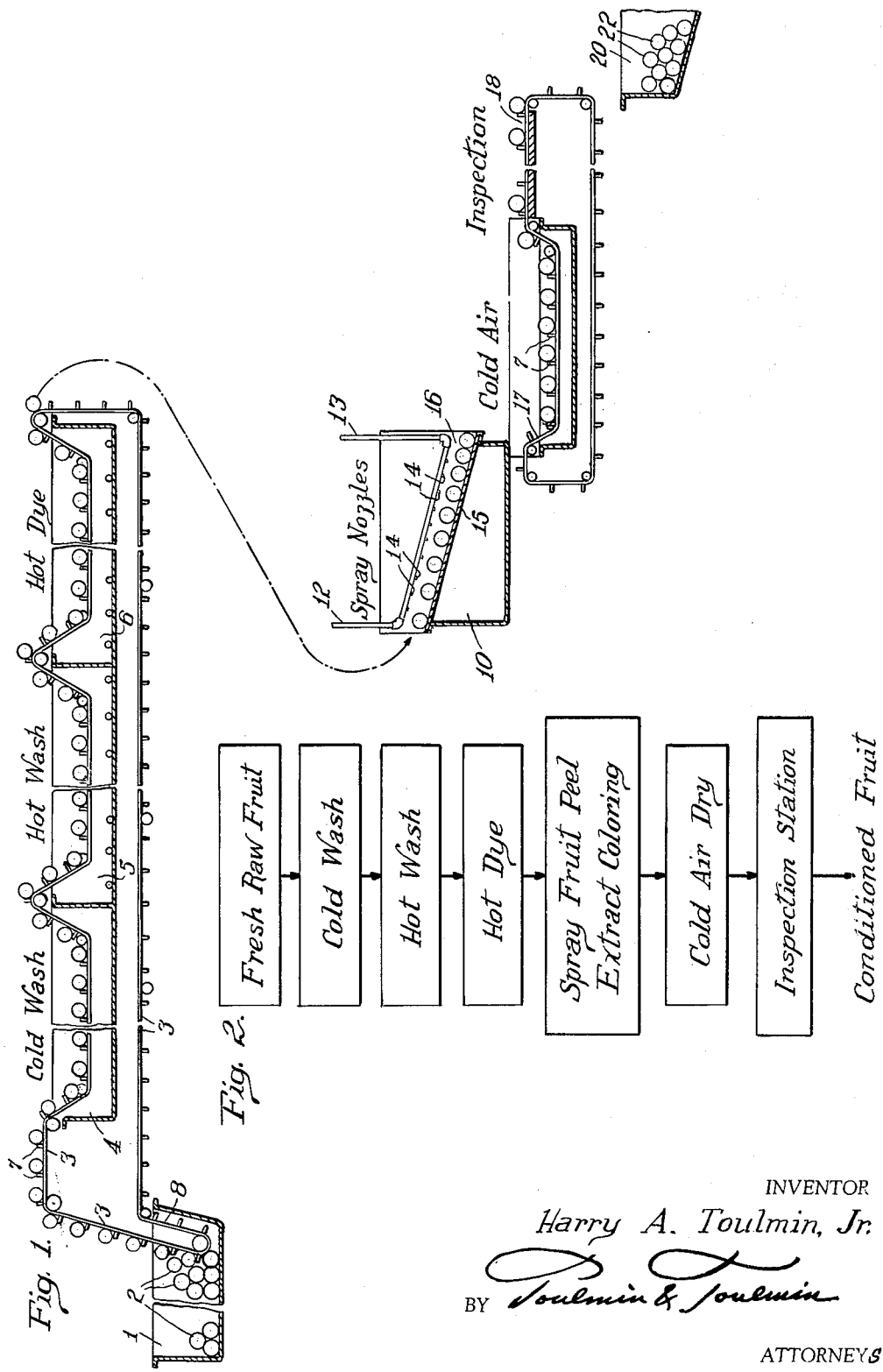

2,739,897
METHOD OF COLORING CITRUS FRUITS

Harry A. Toulmin, Jr., Dayton, Ohio, assignor to The Commonwealth Engineering Company of Ohio, Dayton, Ohio, a corporation of Ohio Application January 26, 1953, Serial No. 333,167

10 Claims. (Cl. 99—103)

This invention relates to a process of treating fruits, vegetables and the like, and more particularly appertains to a method of coloring of citrus fruits, for example, oranges, lemons, grapefruit, limes, melons, etc. to provide them with a pleasing color and to increase their marketability.

It is well known that color alone is not a reliable characteristic of mature and ripe fruit. The yellow or orange colors in the peel of some varieties of citrus fruit, for instance, is often masked by the green pigments. To overcome this and produce a fruit having a pleasing color it has become the practice to artificially color such fruits. Oranges, lemons, limes and the like, accordingly, are often treated with artificial coloring matter or dyes to give them a yellow or orange color, as desired, to simulate the color ordinarily associated with mature, ripe fruit. Employing other methods no actual coloring matter is used at all and the green chlorophyll of the fruit peel is chemically treated whereby the otherwise masked orange or yellow pigment is made to predominate. Still other methods involve the use of yellow and orange synthetic edible dyes for coloring the fruits.

In prior processes for treating fruits to improve their color, however, it has been difficult to produce a product having a natural color and one free of artificial coloring materials. Further, in carrying out the process, the atmosphere and temperature to which the fruit is subjected required careful and accurate control to produce the desired coloration.

One method of coloring fruit employing stove heating of the fruit under controlled atmospheric conditions necessitates that the fruit be conditioned for two weeks or more. This requires the provision of a relatively large storage space and the expense of its maintenance. There is also the added fire hazard accompanying the heating stoves for keeping the fruit at the proper temperature.

The treatment method of the present invention overcomes, for all practical purposes, the disadvantages of prior processes and provides a continuous method for treating fruit whereby the same may be subjected to a combined washing and coloring treatment as the fruit is advanced along from a feeding station to a packing and storage station. The process also provides a fruit having the natural color of the ripe fruit, and wherein each of the individual fruits are of uniform color.

It is a principal object of the present invention to provide a method of treating fruit so as to fortify the color by the application of the natural color pigments as extracted from the peel of mature and ripe fruit directly thereto and without the need for subjecting the fruit to a heat-ripening treatment.

Another object of the invention is to provide an improved method for coloring fruit by the application of color pigments derived from the peelings of the fruit and with or without the addition of suitable dyes or the like.

Another object of the invention is to provide a process of treating raw fruit so as to prepare the same for marketing and wherein the same has a natural ripe color.

It is a further object to provide a process and apparatus which may be operated as a continuous process, whereby the fruit is first washed and a base coloring of dye applied, if desired, and thereafter colored by the application to the surface of the fruit of a liquid coloring composition comprising the coloring substance as contained in the peel of mature, ripe fruit, following which the thus treated fruit is dried and made ready for marketing or storage.

These and other objects and advantages of this invention are more particularly pointed out in the following description taken in connection with the drawings wherein:

Figure 1 illustrates diagrammatically a suitable method and arrangement of carrying out the continuous process of the invention in the treatment of fruit such as oranges or grapefruit; and Figure 2 is a flow sheet showing the principal steps involved in carrying out the method of the invention.

Referring more in detail to the drawings, the reference character 1 designates a hopper for receiving fruit, such as oranges, as shown at 2, which is exemplary of the fruit to be treated. The oranges 2 are conveyed along from the hopper 1 by an endless conveyor 3. The fruit is thus conveyed through a cold and hot water washing tanks 4 and 5, and a hot dye tank 6. The endless conveyor 3 preferably comprises spaced stop members 7 for separating the oranges and permitting free movement of the individual oranges as the endless conveyor is moved therealong through the several tanks and returned to the loading hopper 1, as illustrated by the lower guide return portion 8.

The fruit 2 is conveyed through the tank 4 in which is maintained cold water for washing the fruit and removing foreign matter, after which the fruit is conveyed thence through the tank 5 containing hot water. The hot water removes foreign matter not removed by cold water and prepares the fruit for receiving a suitable dye in the tank 6. The dye tank 6 preferably consists of a dye solution containing edible yellow fat dye to provide a base for receiving a finishing coat of natural color pigment in the spray tank 10. Oranges, or fruit, after passing through the hot dye in tank 6 is subjected to a spray comprising natural coloring as extracted from the ripe peel of the fruit. This coloring extract consists of a pigment-suspension as recovered from the fruit peel of mature, ripe fruit, a suitable solution of the same being circulated through the spray pipes 12 and 13, and applied to the fruit through the spray nozzle 14. The fruit, as shown in Figure 1, passes along therebeneath, rolling down the inclined runway 15 of the chamber 16.

The spray nozzles are suitably spaced both longitudinally and laterally so as to apply the color spray uniformly and evenly over the entire fruit surface. After receiving the coloring spray coating from tank 10, the fruit is discharged onto the endless conveyor 17 and conveyed along while being subjected to cold air blasts to remove volatile solvents and condition the fruit. After passing an inspection station, as illustrated at 18, the fruit is delivered to a storage compartment 20 as a finished product 22.

The natural coloring matter in the case of oranges, as applied in the spray tank 10, preferably comprises an aqueous dispersion of carotene ($C_{40}H_{56}$) and xanthophyll ($C_{40}H_{56}O_2$) pigments and comprises the carotenoids found in the yellow-orange colored flavedo covering of the fruit peel of ripe fruit. The yellow-orange coloring pigment, forming the coloring matter, for application to the fruit may be extracted from the orange oil or citrus oil by treating the oils with activated carbon, the residue left after filtration and consisting of the carbon sludge contains the yellow and orange pigments and especially carotene in relatively high concentration.

An aqueous dispersion or emulsion of these yellow and orange carotenoid pigments, as recovered by the well known cold machine process, may be utilized. The coloring pigments may also be recovered by the process described in my co-pending application 191,389 now U. S. Patent 2,708,627 and relating to a method for refining citrus wastes products, and which application was filed October 21, 1950, for Method and Apparatus of Extracting Peel Oils and Other Waste Products.

In preparing the natural coloring extract the rind consisting of the entire flavedo and even a portion of the albedo may be utilized as the oil extraction for production of the color pigment for spraying on the fruit. The rind of the citrus fruits also contain water-soluble non-carotenoid pigments, such as anthocyanin. The presence of these water-soluble pigments is desirable inasmuch as they function as an emulsifier for the carotenoid pigments which are soluble in fats and oils. To further stabilize the color pigments about 0.01 to 0.10% by weight of naphthol-yellow S is added to the coloring matter.

A suitable coloring extract for spraying onto the fruit contains by weight from 5 to 25% pigment and the remainder water, the proportions of pigment to water being varied, depending upon the pigments, depth of color desired and type of application. A portion of the water may be replaced with ethyl alcohol to provide a more readily volatilizable and penetrating vehicle for application of the color pigments. Further, a small amount, 0.10 to 0.50% by weight, of an edible emulsifying agent may be added to enhance the suspension of the color pigments in the aqueous vehicle. For this purpose citrus peel extract (dehydrated), as obtained by the method described in my prior application, Serial No. 191,389, now U. S. Patent 2,708,627 may be used.

Instead of applying the natural coloring extract as a spray the fruit may be passed through a liquid bath containing the color pigments or dipped or brushed onto the fruit.

The temperature of the hot water wash in tank 5 is such as will heat up the fruit peel to expand its pores and prepare it to receive the coloring dye and pigment. The water bath preferably is held between about 70 and 90° C. A similar temperature is maintained in the dye bath 6.

As a modification of the method of coloring the fruit utilizing yellow pigments, carotene and xanthophyll constituents of the peel or rind of the ripe fruit, the atmosphere of the spray chamber in the tank 10 may be controlled and gases introduced to enhance and speed up the coloration of the fruit. For instance, ethylene ($C_2H_4$) may be introduced into the spray chamber or a mixture of ethylene with other unsaturated hydrocarbons may be introduced into the spray chamber and maintained in contact with the fruit passing therethrough whereby the desired change in color is substantially enhanced. The presence of these unsaturated hydrocarbon gases activate the peel of the citrus fruit and stimulate its activity whereby the orange or yellow color pigment becomes more pronounced.

In the treatment of other fruits, such as mandarines, tangerines and lemons, etc. the desired color is applied to the surface of the fruit and dried similarly as in the case of oranges. In each instance, the fruit being treated is colored by the color pigments extracted from the peel of ripened fruit of the same character.

It is to be understood that while the invention has been described with particular reference to oranges, and a preferred method of treatment described, various modifications and changes which will occur to those skilled in the art may be made to suit different conditions and products treated without departing from the spirit and scope of the invention, and which is more specifically set out in the claims.

Having thus described my invention, what is claimed as new is:

1. A process for treating raw fruit comprising the steps of cold washing said fruit, subjecting the fruit to a hot wash, applying an edible fat dye to the hot washed fruit and spraying the fruit with a coloring extract wherein the color pigment ingredient consists of a color extracted from the ripened fruit peel.

2. A process of washing and coloring fruit comprising the steps of washing said fruit, and applying a color coating thereto, said color coating consisting of edible fat dye and pigment extracted from the peel of the fruit in a ripened state dispersed in an aqueous vehicle, said color coating being applied by spraying the aqueous dispersion of pigment uniformly over the surface of the fruit.

3. A process of treating raw citrus fruit to condition the same and provide the same with a uniform coloring comprising the steps of (a) washing the fruit (b) applying a hot edible fat dye to the washed fruit, (c) applying thereover a coloring extract from the fruit peel waste consisting of an aqueous dispersion of yellow and orange carotenoid pigments and drying the fruit to provide a conditioned fruit.

4. A process of treating and coloring citrus fruit wherein the fruit is subjected to washing and dyeing processing steps, the improvement consisting of applying to said washed and dyed fruit a color coating consisting of an extract from the rind of said fruit whereby a fruit having the color of natural ripe fruit is provided.

5. A process of treating citrus fruit comprising moving the fruit along in a continuous manner through a cold and hot water wash and thence to a hot dip solution containing an edible fat dye, subjecting the said dyed fruit to a spray coating comprising a coloring extract derived from the peel of said fruit in a ripe state and drying the resultant colored fruit.

6. A process of treating citrus fruit comprising the steps of (a) subjecting the fruit to a cold water wash, (b) subjecting the cold washed fruit to a hot water wash, (c) treating the hot washed fruit to an edible fat dye solution, and (d) applying over the resultant dyed fruit a coloring liquid emulsion comprising an aqueous dispersion of color pigments including carotene, xanthophyll and anthocyanin as contained in the rind of the natural ripe fruit being treated.

7. A process of treating citrus fruit comprising the steps of (a) subjecting the fruit to a cold water wash, (b) subjecting the cold washed fruit to a hot water wash, (c) treating the hot washed fruit to an edible fat dye solution to dye the fruit, (d) applying over the resultant dyed fruit a coloring liquid emulsion comprising an aqueous dispersion of natural color pigments separated from the rind of the natural ripe fruit being treated, and (e) subjecting the resultant colored fruit to a cold air drying conditioning treatment.

8. In a process of washing and coloring citrus fruit the improvement which consists in applying to said fruit an edible fat dye and a coloring dispersion containing carotenoids extracted from the peel of ripened citrus fruit as the principal color pigments.

9. A process of coloring fruits comprising applying to the fruit an aqueous color dispersion containing natural carotenoids extracted from the peel of ripened fruit as the principal color pigments, said color dispersion being applied to said fruit in an atmosphere containing unsaturated hydrocarbons to activate the peel.

10. A process of coloring fruits comprising applying to the fruit an aqueous color dispersion containing carotenoids and xanthophyll extracted from the peel of ripened fruit as the principal color pigments, said color dispersion being applied to said fruit in an atmosphere containing ethylene gas to activate the peel.

(References on following page)

References Cited in the file of this patent

UNITED STATES PATENTS

| | | |
|---|---|---|
| 1,203,806 | Stock | Nov. 7, 1916 |
| 1,245,380 | Peters | Nov. 6, 1917 |
| 1,676,714 | Smallidge | July 10, 1928 |
| 1,991,324 | Keech | Feb. 17, 1935 |
| 2,092,090 | Sharma | Sept. 7, 1937 |
| 2,136,118 | Palmer | Nov. 8, 1938 |
| 2,249,792 | Skinner | July 22, 1941 |
| 2,567,362 | Berkman | Sept. 11, 1951 |
| 2,641,176 | Higgins et al. | June 9, 1953 |

OTHER REFERENCES

"Citrus Products," 1949, by Braverman, published by Interscience Publishers, Inc., N. Y., pages 29 to 33 and 36.

"Canadian Chemistry and Process Industries," March 1951, pages 210 to 213, article entitled Canadian Food Colour Regulations.